Figure 1:
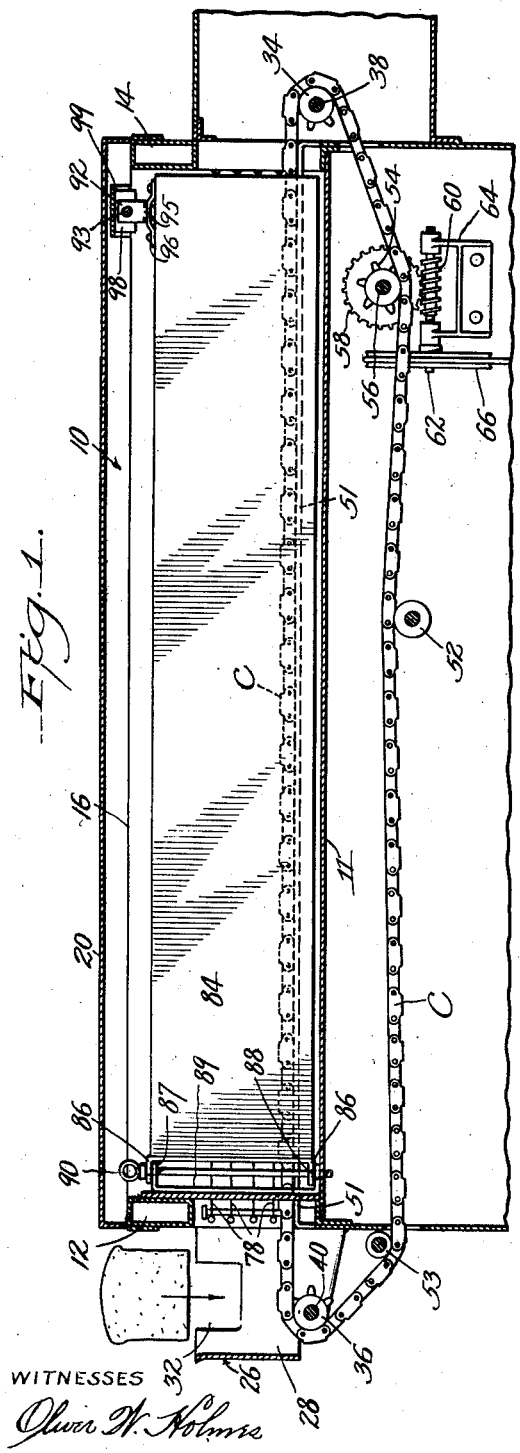

Nov. 3, 1925.  
A. DE MATTEIS  
1,560,220  
AUTOMATIC TOASTER  
Filed Nov. 17, 1924  
2 Sheets-Sheet 1

WITNESSES  
Oliver W. Holmes

INVENTOR  
ALFREDO DE MATTEIS  
BY Cornelius C. Billings  
ATTORNEY

INVENTOR
ALFREDO DE MATTEIS

Patented Nov. 3, 1925.

1,560,220

UNITED STATES PATENT OFFICE.

ALFREDO DE MATTEIS, OF NEW YORK, N. Y.

AUTOMATIC TOASTER.

Application filed November 17, 1924. Serial No. 750,299.

*To all whom it may concern:*

Be it known that I, ALFREDO DE MATTEIS, a citizen of the United States, and a resident of the borough of Manhattan, city, county, and State of New York, have invented certain new and useful Improvements in Automatic Toasters, of which the following is a specification.

My present invention relates to toasting apparatus and, more particularly, to improvements in automatic toasters of the type described in my Patent No. 1,473,213.

In apparatus of the above indicated type, slices of bread or other similar articles of food to be toasted, are carried in succession by a conveyor mechanism during a definite period of time between a pair of spaced upright heating elements from which heat is radiated to each side of the slice exposed thereto. The length of time of heating is thus automatically established and the temperatures of the elements are so adjusted or established in relation to the time of heating that the bread receives the requisite heating during its passage between the heaters. Thus, if electric heating is used, the resistance of the wire is so selected, relative to the voltage for which the apparatus is designed, usually 110 or 220 volts, as to provide the requisite temperature in the heating wires. Or, if gas heating is used, the burner orifices are suitably designed for the pressure and heating quality of the gas. If, however, the voltage supplied is slightly different from that for which the apparatus was designed, for example 115 or 120 volts instead of 110 volts or 230 or 240 volts instead of 220 volts, the heating effect will be thrown out of adjustment and the bread will be over heated. In an analogous manner the temperatures of the gas flames may vary slightly from that for which the time of treatment was adjusted.

One object of my present invention is to provide an apparatus of the above indicated type in which an accurate adjustment of the heating effect may be readily obtained.

Another object of the invention is to provide an apparatus of the type indicated in which the heating effect may be readily adjusted or regulated without altering the electric resistance or flame or radiating temperature of the heating elements.

Further objects of the invention are to provide an apparatus of the type indicated in which the heating effect may be adjusted in a uniform or uniformly graded manner throughout the path of travel of the bread being toasted, to provide an adjustment that can be readily seen and estimated and in which the adjustment of the heating effect on each side of the bread will be equal.

With these and other objects in view, which will be more fully brought out in the following description of the invention, the invention comprises the apparatus described and claimed in the following specification and claims.

Figure 2:
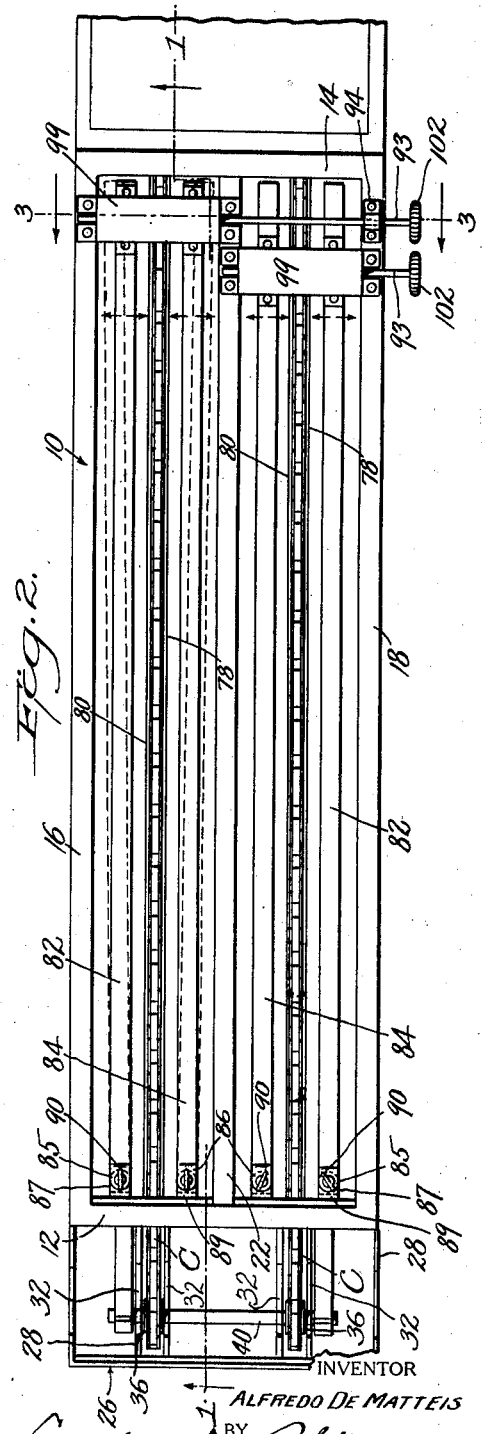
Figure 3:
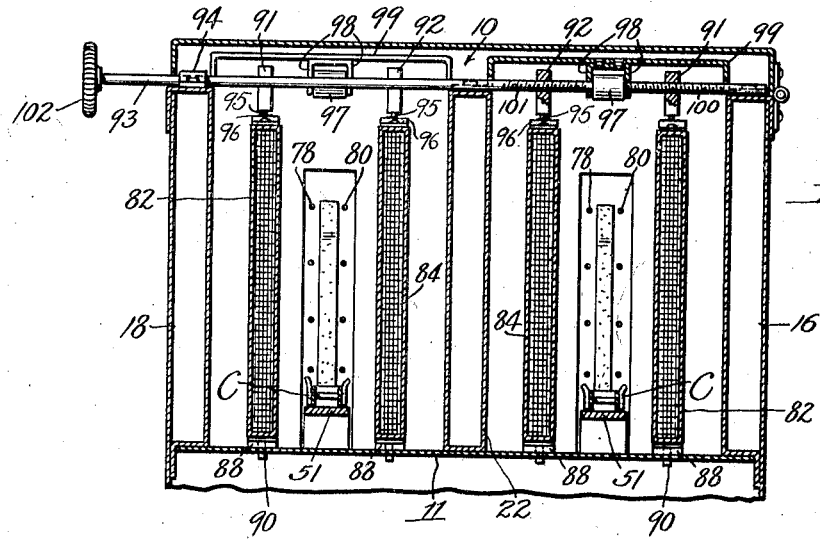
Figure 4:
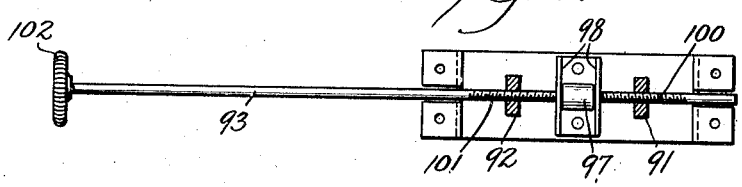
Figure 5:
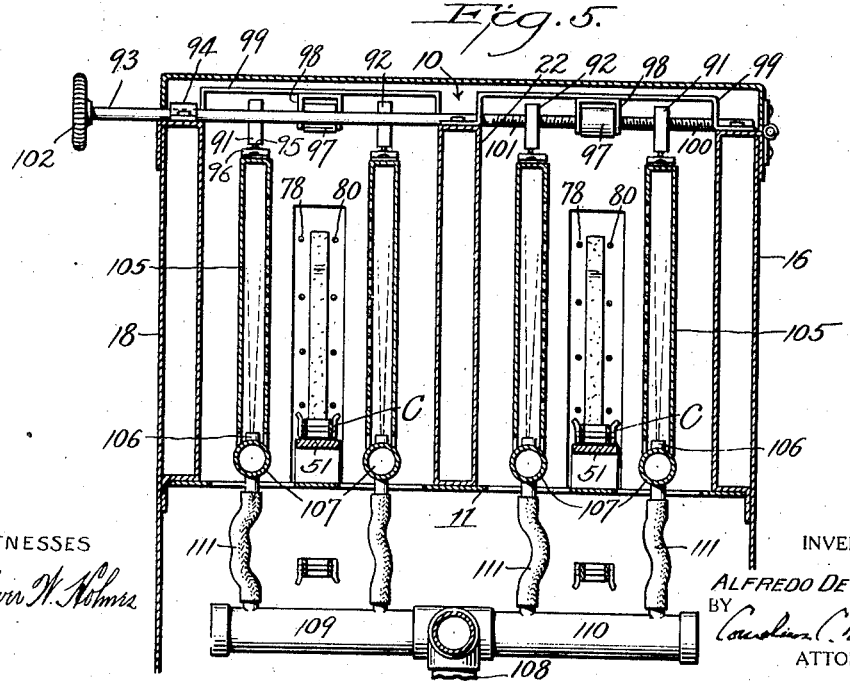

The various features of the invention are illustrated in the accompanying drawings in which:

Fig. 1 is a vertical, longitudinal, sectional view, taken on line 1—1 of Fig. 2 of a toasting apparatus embodying a preferred form of my invention in which electric heating is employed, Fig. 2 is a plan view of the toasting apparatus shown in Fig. 1, Fig. 3 is a transverse, vertical, sectional, view of the toasting apparatus taken on line 3—3 of Fig. 2, Fig. 4 is an inverted plan view of an adjusting device forming a part of my invention, and Fig. 5 is a transverse vertical, sectional view, similar to that of Fig. 3 of a modified form of the invention.

In my present invention, the heating elements are so supported on each side of a central bread carrying conveyor as to be adjustable sidewise to or from the conveyor. The adjusting means is so devised that by a single adjusting movement the heating elements are simultaneously and equally moved towards or from the conveyor. For this purpose the heating elements are preferably mounted at one end on fixed vertical pivotal axes and at their other ends are mounted on supporting members that are movable in unison at uniform speeds towards and away from the center line of the conveyor mechanism, preferably by means of a right and left threaded supporting rod.

Referring more particularly to the accompanying drawings, the invention is described as applied to the apparatus of Patent No. 1,473,213, the reference numerals in the drawings following as closely as practicable those of said patent.

In this apparatus, one or more toasting elements, two of which are shown by way of example, are enclosed within a heating compartment 10 having a bottom wall 11, end walls 12 and 14, side walls 16 and 18 and a top plate 20, which may serve as a hot plate or table for keeping foods warm. When more than one heating element is enclosed in one compartment they may be separated by partition walls 22.

The slices of bread to be toasted are fed into hoppers 26 at one end of the heating compartment, one for each toasting element, having side walls 28 spaced slightly further apart than the width of the slice to be toasted and having notches 32 to receive the fingers as the bread is inserted.

The bread inserted into the hoppers 26 is received on a conveyor chain C supported at the end within the compartment on a sprocket wheel 34 and at the end within the hopper 26 on a sprocket 36, the sprockets 34 and 36 being mounted on suitable shafts 38 and 40, respectively. The conveyor or carrier chain C may be of any suitable construction adapted to carry the slices in upright position, and is preferably of the type and construction shown and described in the above mentioned Patent No. 1,473,213. The carrier chain C is supported between the wheels 34 and 36 by means of a bar or supporting plate 51, and, beneath this bar, is trained about idler rolls 52 and 53 and a drive sprocket 54 carried on a shaft 56. The shaft 56 may be driven in any suitable, uniform, manner. For this purpose it is provided with a worm-wheel 58, meshing with and driven from a worm 60 on a shaft 62 mounted in bearings in a bracket 64 which may be driven through the pulley 66 from any suitable source of power.

For guiding the slices of bread to be toasted, I have provided wires 78 and 80 extending parallel to the center line of the carrier and located above it as shown in Figs. 1, 3 and 5. These wires assist in holding the toast in an upright position as it travels through the compartment on the carrier C and positively prevent the slices from falling sidewise. The wires are mounted, as described in the above mentioned patent, to hold them taut and in position regardless of expansion and contraction.

Various means may be provided for heating the sides of the slices carried through the compartment 10 in the conveyor C. In the preferred embodiment of the invention illustrated in Figs. 1, 2 and 3, each conveyor chain C is provided on each side with a suitable electric resistance element represented diagrammatically at 82 and 84.

In my present invention, these heating elements are so supported as to be adjustable at uniform rates simultaneously to and from the center line of the conveyor chain C. For this purpose, the heaters 82 and 84 are supported at their ends adjacent the hopper 26, by endwise-projecting supporting ears 85 and 86, resting on upper and lower supporting ledges 87 and 88, respectively, of a bracket 89 and secured thereon by a vertical pivot pin 90 which permits the heaters to swing sidewise on the brackets. These ends of the heaters are thus held in fixed spaced relation to each other and to the conveyor C, while the other end is permitted to be swung towards and away from the center line of the conveyor.

The opposite ends of each pair of heaters 82 and 84 are supported by means of ears 91 and 92, respectively, from a common transverse supporting shaft 93 and movable to and from each other on the shaft. Each ear 91 and 92 is pivotally mounted at 95 within a bracket 96, which brackets are secured to the respective heating elements. The shaft 93 is rotatably mounted in bearings 94 on the walls of the compartment 10 and is held from endwise movement by means of a collar 97 rigidly mounted on the shaft and positioned between a pair of ears 98 depending, at each end of the collar, from a cross bar 99 mounted on and spanning the space between the partition 22 and the respective side walls 16 and 18. The shaft 93 is provided with right and left handed threads 100 and 101 on opposite sides of the collars 97 and these threads are threaded through suitably threaded openings in the ears 91 and 92. Accordingly, as the shaft 93 is rotated in one direction the ears 91 and 92 are moved away from each other on opposite sides of the center line of the conveyor C and when rotated in the opposite direction are moved towards each other and towards the center line of the conveyor C. The pitch of the screw threads 100 and 101 are equal so that the movements of the heaters are equal and simultaneous. To enable the shafts 93 to be rotated they are provided at their outer ends with knurled knobs 102.

The manner of supporting the heating elements when gas heated elements are used is similar to that described above, the supporting ears being, for example mounted on a housing or mantle 105, of suitable, refractory, radiating material, within which gas flames or jets are projected upwardly from orifices 106 at suitable intervals in the length of a distributing pipe 107 supported lengthwise at the lower edge of the mantle. Gas is supplied to the distributing pipes 107 from a central supply main 108 through branch pipes 109 and 110 and flexible connecting tubes 111 of rubber or other suitable material. As the shafts 93 are rotated in this form of embodiment of the invention, the housings or mantles 105 are swung sidewise in the same manner as the electric elements 82 and 84.

With the above invention, the distances of the heating elements from the conveyor, and accordingly the heating effect on the passing slices of bread, may be readily adjusted, without varying the resistance of the electric heating element or the size of the gas flame, to correct any variation from normal of the voltages or other characteristics of the heating means, or to provide a desired toasting effect. The extent of the variation in the positions of the heating elements may be readily seen and estimated and this adjustment may be readily made while the apparatus is in use and while the results of the adjustments may be readily seen and followed.

As changes of construction could be made within the scope of my invention, it is intended that all the matter contained in the above description or shown in the accompanying drawing be interpreted as illustrative and not in a limiting sense.

Having described my invention, what I claim and desire to secure by Letters Patent is:

1. Apparatus of the type described which comprises, a conveyor mechanism adapted to carry slices of bread, a heating element pivoted on each side of said slices of bread carried on said conveyor and means for angularly adjusting each of said heating elements on its pivot towards or from said slices.

2. Apparatus of the type described which comprises, a conveyor mechanism adapted to carry slices of bread in upright position, heating means on each side of said conveyor each of said heating means being pivoted at one end and free at the other end, and means for adjusting the angular distances of said heating means from the center line of said conveyor.

3. Apparatus of the type described which comprises, a conveyor mechanism adapted to carry slices of bread in upright position, heating means on each side of said conveyor each of said heating means being pivoted at one end and free at the other end, and means for simultaneously and equally adjusting the angular distances of said heaters from the center line of said conveyor.

4. Apparatus of the type described which comprises, a conveyor mechanism adapted to carry slices of bread in upright position, a pair of spaced heating elements, one on each side of said conveyor each of said heating elements being pivoted at one end and free at the other end, a transverse supporting shaft at the free ends of said heating elements having right and left hand threads and means for supporting one heating element on one thread and the other heating element on the other thread.

5. Apparatus of the type described which comprises, a conveyor mechanism adapted to carry slices of bread in upright position, a pair of spaced heating elements, one on each side of said conveyor, means for supporting said heating elements at one end on a vertical pivotal axis, a transverse supporting shaft at the other ends of said heaters having right and left hand threads, and means for supporting said heaters respectively from said right and left hand threaded portions of said shaft.

6. Apparatus of the type described which comprises, a conveyor mechanism adapted to carry slices of bread in upright position, a pair of spaced heating elements, one on each side of said conveyor, each of said heating elements being pivoted at one end and free at the other end, a transverse supporting element for said heaters at their free ends, and means for angularly adjusting said heating elements sidewise on said supporting element to or from said conveyor mechanism.

7. Apparatus of the type described which comprises, a conveyor mechanism adapted to carry slices of bread in upright position, a pair of spaced heating elements, one on each side of said conveyor, means for pivotally supporting said heating elements at one end to swing on a vertical axis, and a transverse supporting means at the other ends of said heating elements permitting said heating elements to be swung to sidewise adjustments thereon.

8. Apparatus of the type described which comprises, a conveyor mechanism adapted to carry slices of bread in upright position, a pair of spaced heating elements, one on each side of said conveyor, means for pivotally supporting said heating elements at one end to swing on a vertical axis, and a transverse supporting means at the other ends of said heating elements, and means for simultaneously and equally moving said ends of said heating elements towards and from the center line of said conveyor mechanism.

9. Apparatus of the type described which comprises, a conveyor mechanism adapted to carry slices of bread in upright position, a heating element at the side of and spaced from said conveyor mechanism, a bracket at one end of said heating element, ears on said end of said heating element supported on said bracket and a vertical securing pin for pivotally securing said ears on said bracket.

10. Apparatus of the type described which comprises, a conveyor mechanism adapted to carry slices of bread in upright position, a pair of spaced heating elements, one at each side of said conveyor mechanism, a bracket at one end of each heating element, ears on said ends of said heating element resting on said brackets, means for securing said ears to swing on said brackets on a vertical axis, a transverse supporting shaft at the other ends of said heating elements, means for supporting said ends of said heaters from said shaft and means for uniformly and simultaneously moving said ends towards or from the center line of said conveyor as said shaft is turned.

ALFREDO DE MATTEIS.